(No Model.)
R. W. WILLSON.
ELECTRICAL CONTROL FOR PENDULUM CLOCKS.
No. 270,533. Patented Jan. 9, 1883.
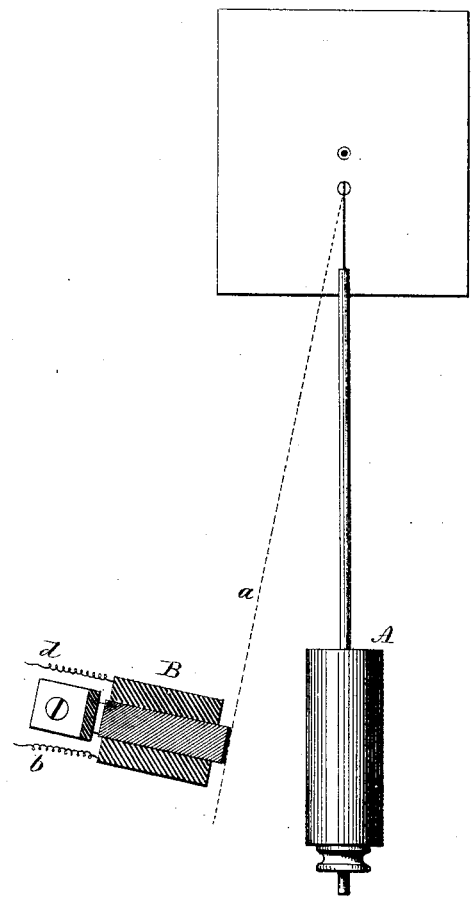

UNITED STATES PATENT OFFICE.

ROBERT W. WILLSON, OF NEW HAVEN, CONNECTICUT, ASSIGNOR TO THE STANDARD TIME COMPANY, OF SAME PLACE.

ELECTRICAL CONTROL FOR PENDULUM-CLOCKS.

SPECIFICATION forming part of Letters Patent No. 270,533, dated January 9, 1883.

Application filed December 2, 1881. (No model.)

*To all whom it may concern:*

Be it known that I, ROBERT W. WILLSON, of New Haven, in the county of New Haven and State of Connecticut, have invented a new Improvement in Electrical Control for Pendulum-Clocks; and I do hereby declare the following, when taken in connection with the accompanying drawing and the letters of reference marked thereon, to be a full, clear, and exact description of the same, and which said drawing constitutes part of this specification, and represents in the figure a clock-pendulum and a magnet in its proper relation thereto.

This invention relates to an electrical device for regulating clocks, the object being to apply such regulating device to clocks having the common train of gears with weight or other spring to impart the motive power thereto, and the pendulum vibrating to operate the verge, and so that several clocks upon a single circuit may be regulated from a central point—as, for instance, from an observatory or from any standard clock with which the clocks to be regulated may be in connection.

The invention consists in the arrangement of a magnet through which the current is made and broken at predetermined intervals—say seconds—in such relation to the pendulum receiving its impulse from a common clock-movement, and so that as it approaches, under the impulse given to it by the clock mechanism, the magnet at one of the extremes of its movement, it will come within the influence of and so as to be attracted by the magnet, and its movement be accelerated if it be running too slow, or held to the magnet if it be running too fast, so that its return will occur at the instant the circuit is broken, and as more fully hereinafter described. The train of clock-gearing—the weight or spring by which it is operated to impart an impulse to the pendulum—is too well known to require description. In the illustration I therefore show simply the pendulum-rod suspended at its center of vibration.

A represents the pendulum of a common clock, the line *a* representing its extreme or required vibration.

B is a magnet arranged in the clock-case, so that its attractive point will stand on the line of extreme vibration *a* of the pendulum, preferably at about the center of oscillation of the pendulum. This magnet is provided with the usual incoming and outgoing wires *b d*. The particular construction of this magnet is immaterial to the operation of the device. The circuit in which the magnet is arranged is worked from a given point—say from a regulating clock or mechanism of an observatory—or from any regulating device which will make and break the electrical circuit at predetermined intervals, which are small multiples of the time of vibration of the controlled pendulum—say, for illustration, once a second. Preferably the magnet is arranged so that the pendulum will just come into contact with it at the extreme vibration; yet it may be slightly off, or so as to intercept the pendulum before it would fully complete its natural vibration, but not so as to interfere with the escapement.

The operation of this regulator or control of the pendulum is as follows: The pendulum, swinging naturally by the impulse given to it from the clock-movement, approaches the magnet at one extreme of its vibration. If the beat of the pendulum be regular and accurate to correspond with that of the regulator-clock—that is, under the supposed case, so as to approach the magnet at the termination of each second—the influence of the magnet or regulator will not be felt so long as such regular and timely beating continues; but should the impulse of the clock-movement be so great as to give a quicker vibration than it should do for the proper running of the clock, then the pendulum will approach the magnet before the circuit is broken, hence will be attracted to the magnet and held in contact therewith until the circuit at the proper time is broken. Such breaking of the circuit will release the pendulum and permit it to swing, and so continuing will attract the pendulum and hold it so long as it swings too rapidly and until its swing is so far retarded as to be regular and on time. On the contrary, suppose the swing of the pendulum to be too slow. As it approaches the magnet a little behind its proper time it will be drawn quickly to the magnet, and before the circuit is broken, so that it will accelerate the movement of the pendulum until it shall finally come into contact with the magnet. If the first accelerated impulse given to the pendulum by the magnet is not sufficient, that acceleration will be increased through each successive vibration until the pendulum moves on time. It will be seen that by this electrical control of the pendulum there need be no nice adjustment of the pendulum itself to regulate its movement or to cause it to move either faster or slower. The movement or swing of the pendulum will be, under the impulse given to it by the mechanism of the clock, controlled entirely by the magnet. The pendulum therefore may be much lighter than the pendulum could be for the same clock without this electrical control; hence a correspondingly less power will be required for the mechanical impulse to be given to the pendulum by the clock-movement. It will also be observed that this electrical control can be applied to pendulum-clocks of the cheapest character, such a clock giving as accurately-regulated time as the best clock-regulator—that is to say, its time will be positively that of the regulator itself.

I claim—

In combination with a clock-movement having a pendulum to which vibratory impulses are imparted in the usual manner for pendulum-clock movements, a magnet through which an electrical current is made and broken at predetermined intervals in the relation to the pendulum, substantially as described, so that the pendulum approaches the magnet at one of the extremes of its movement, and will be brought into actual contact with and arrested by the magnet, hastened into such contact if it be too slow, or held in such contact if it be too fast, the holding contact broken at said predetermined intervals, substantially as described.

ROBT. W. WILLSON.

Witnesses:
LILLIAN D. ROGERS,
JOS. C. EARLE.